United States Patent

Drozdyk et al.

[11] Patent Number: 5,393,465
[45] Date of Patent: Feb. 28, 1995

[54] LIGHT-ABSORBING DIELECTRIC COMPOSITIONS

[75] Inventors: Lorri P. Drozdyk, Hillsborough, N.C.; Roger H. French, Wilmington, Del.; Kenneth W. Hang, West Chester, Pa.; Arvind Halliyal, Durham, N.C.

[73] Assignee: E. I. Du Pont de Nemours and Company, Wilmington, Del.

[21] Appl. No.: 165,244

[22] Filed: Dec. 13, 1993

Related U.S. Application Data

[63] Continuation of Ser. No. 790,864, Nov. 14, 1991, abandoned.

[51] Int. Cl.[6] .................... H01B 1/00; H01B 1/02; H01B 1/20
[52] U.S. Cl. .................... 252/518; 252/520; 501/17; 501/18; 501/20; 106/1.05; 106/1.22
[58] Field of Search .................. 252/518, 520; 501/17, 501/18, 20; 106/1.05, 1.22

[56] References Cited

U.S. PATENT DOCUMENTS

| | | | |
|---|---|---|---|
| 4,481,261 | 11/1984 | Johnson et al. | 501/17 |
| 4,551,357 | 11/1985 | Takeuchi | 427/96 |
| 4,613,648 | 9/1986 | Usala | 524/555 |
| 4,814,304 | 3/1989 | Takeuchi et al. | 501/15 |
| 5,137,848 | 8/1992 | Barker et al. | 501/18 |
| 5,179,047 | 1/1993 | Chiba | 501/15 |

OTHER PUBLICATIONS

*Chemical Abstrcts*, vol. 90, No. 24, Jun. 1979, Abstract No. 191488f.

*Derwent Publications Ltd.*, Accession No. 79–15061-B/O8, (no date), Jan. 1979.

*Primary Examiner*—Paul Lieberman
*Assistant Examiner*—Gregory R. Delcotto

[57] ABSTRACT

A composition for making fired dielectric layers which is especially suitable for laser scribing consisting essentially of finely divided particles of dielectric glass, inorganic filler having a refractive index higher than the glass and cobalt oxide, all being dispersed in organic medium. The composition can be in the form of either thick film paste or green tape.

10 Claims, No Drawings

LIGHT-ABSORBING DIELECTRIC COMPOSITIONS

This is a continuation of application Ser. No. 07/790,864, filed Nov. 14, 1991, now abandoned.

FIELD OF INVENTION

The invention is directed to dielectric compositions and particularly to dielectric compositions which absorb 1.06 $\mu$m wavelength light.

BACKGROUND OF THE INVENTION

Typically a thick film dielectric is composed of fine particle glass mixed with ceramic oxide particulate fillers suspended in an organic vehicle suitable for screen printing. The filler is mixed with glass to optimize a broad set of property requirements which typically involve increasing fracture toughness and strength. Most fillers also have an effect on the optical properties of the dielectric because they have refractive indexes which are sufficiently different from the glass so that they will act to scatter light. However, light scattering alone is normally not sufficient to provide laser trim characteristics desirable for a multilayer thick film dielectric.

Two principal features of the dielectric are important for desired performance. The first characteristic is the ability to laser trim resistors, cutting through the resistor material, and continuing into the dielectric below. A suitable dielectric provides sufficient strength and light scattering to diffuse the localized laser energy so that brittle cracking or chipping of the dielectric are avoided. A dielectric which is prone to cracking will continue to propagate a crack which was initiated during trimming. This type of minimal performance, typical of many commercial dielectrics, suffers from inadequate performance for protection of conductor lines buried beneath a dielectric layer (30 $\mu$m). Since it is always desirable to trim resistors with somewhat more energy than is necessary to simply remove the resistor material, so as to assure complete removal of all resistive paths, the dielectric must be expected to trim well without crack propagation.

SUMMARY OF THE INVENTION

The invention is directed to a composition for making fired dielectric layers, which are especially suitable for laser scribing consisting essentially of finely divided particles of:

(a) 68.0–94.99% wt. dielectric glass;
(b) 5–30% wt. inorganic filler having a refractive index at least 0.07 higher than the refractive index of the dielectric glass; and
(c) 0.01–2.0% wt. cobalt oxide, all of (a), (b) and (c) being dispersed in
(d) an organic medium.

DETAILED DESCRIPTION OF THE INVENTION

Dielectrics are colored and/or pigmented with a variety of organic dyes and ceramic oxide pigments. Whereas ceramic pigments (such as Co aluminate, CoCr aluminate, etc.) provide both color and pigment value, they do not absorb sufficient laser light in the range of 1.06 $\mu$m. Applicants have found that certain oxides when added to a dielectric formulation are capable of absorbing laser light of 1.06 $\mu$m wave length.

Ruthenium oxide and compound ruthenates typically used in resistor materials have excellent absorption properties for 1.06 $\mu$m light. Initial trials lead to formulation of dielectric materials containing small amounts of a known laser absorber such as $RuO_2$ along with a ceramic oxide known to produce optical scattering, such as $Al_2O_3$. Dielectrics formulated with $RuO_2$ and $Al_2O_3$ were found to have improved laser trim performance; however adverse electrical property effects were noted.. The dissipation factors were higher for dielectrics having both alumina and fine particle $RuO_2$ added, compared to dielectrics with only $Al_2O_3$ filler. Applicants have found that the addition of cobalt oxide in either of the chemically available forms, $Co_3O_4$ and CoO, having a particle size less than 5 microns is effective for increasing the absorption of 1.06 $\mu$m light while not altering the electrical properties of the dielectric. The combination of light scattering with light absorption provides latitude with which to formulate dielectrics suitable as a substrate for laser trimming overprinted thick film resistors, as well as to protect buried conductor circuit lines beneath dielectric layers.

In the construction of multilayer circuits, the formation of via interconnections is improved by a dielectric which may be laser drilled without cracking the surrounding dielectric material. The practice of the dielectric formulation advocated in this disclosure provides a means to laser ablate local regions of fired, densified dielectric ceramic material without damage to surrounding dielectric material. The practice of laser ablation may also be applied to the unfired or "green" ceramic dielectric. Holes in unfired ceramics having ratios of depth to diameter of 10–15 to 1 may be drilled. Holes 4 $\mu$m in diameter, 60$\mu$ deep are typical.

The factors important in providing acceptable laser ablation of fired or unfired dielectric with no cracks are the refractive index of the filler relative to the glass frit, the particle sizes and the amount of filler and cobalt oxide added. These factors substantially influence laser beam scattering. The fillers suitable for this purpose are refractory ceramic materials having a refractive index greater than the matrix glass phase. A minimum of 0.07 refractive index difference is desired. Filler concentrations between 5 and 35% by vol. are possible. The particle size of fillers is desirably between 0.3–3 $\mu$m diameter. A preferred filler is alpha alumina oxide having a mean diameter of 0.7 $\mu$m. The refractive index of glasses used in the Examples are about 1.59. Since alumina has a refractive index of 1.765, a difference of 0.175 in refractive index is provided in the Examples. Refractory fillers having high refractive index such as zircon (1.95) and zirconia (2.19) are also preferred.

The scattering and absorption of laser light is increased with the amount of the absorbing/scattering agent added. The scattering of laser light is a strong function of cobalt oxide particle size with 0.8 $\mu$m particle size giving optimal scattering for 1.06 $\mu$m laser. When the particle size of the cobalt oxide is descreased, light scattering increases. However, if the particles are smaller than 0.8 $\mu$m, more back scattering of the laser light takes place at the expense of forward scattering.

Preferred dielectrics for use in the invention are partially crystallizable amorphous alkaline earth metal silicate glasses such as those disclosed in co-pending U.S. patent applications Ser. No. 07/653,872 and Ser. No. 07/653,874, filed Feb. 8, 1991.

Organic Medium

Organic media suitable for use in the invention are selected according to the physical form in which the encapsulant compositions are applied. In particular, the encapsulant glass frit can be applied as a thick film paste by screen printing and it can also be applied as a green tape.

When the encapsulant is applied by screen printing, the particles thereof are mixed with an inert liquid medium (vehicle) by mechanical mixing (e.g., on a roll mill) to form a pastelike composition having suitable consistency and rheology for screen printing. The latter is printed as a "thick film" in the conventional manner.

The main purpose of the organic medium is to serve as a vehicle for dispersion of the finely divided solids of the composition in such form that it can readily be applied to ceramic or other substrates. Thus the organic medium must first of all be one in which the solids are dispersible with an adequate degree of stability. Secondly, the rheological properties of the organic medium must be such that they lend good application properties to the dispersion.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling, and good firing properties. Satisfactory appearance of the fired composition is also important.

In view of all these criteria, a wide variety of liquids can be used as organic medium. The organic medium for most thick film compositions is typically a solution of resin in a solvent frequently also containing thixotropic agents and wetting agents. The solvents usually boil within the range of 130°–350° C.

Suitable solvents include kerosene, mineral spirits, dibutylphthalate, butyl Carbitol®, butyl Carbitol® acetate, hexylene glycol and high boiling alcohols and alcohol esters. Various combinations of these and other solvents are formulated to obtain the desired viscosity and volatility.

By far the most frequently used and a frequently preferred resin for this purpose is ethyl cellulose. However, resins such as ethylhydroxyethyl cellulose, wood rosin, mixtures of ethyl cellulose and phenolic resins, polymethacrylates of lower alcohols and monobutyl ether of ethylene glycol monoacetate can also be used.

A preferred vehicle for thick film applications is based on ethyl cellulose and $\beta$-terpineol in a weight ratio of about 1:8. The pastes are conveniently prepared on a three-roll mill. A preferred viscosity for these compositions is approximately 100–200 Pa.s. measured on a Brookfield HBT viscometer using a #5 spindle at 10 rpm. The amount of vehicle utilized is determined by the final desired formulation viscosity.

Among the thixotropic agents which are commonly used are hydrogenated castor oil and derivatives thereof and ethyl cellulose. It is, of course, not always necessary to incorporate a thixotropic agent since the solvent resin properties coupled with the shear thinning inherent in any suspension may alone be suitable in this regard. Suitable wetting agents include phosphate esters and soya lecithin.

The ratio of organic medium to solids in the paste dispersions can vary considerably and depends upon the manner in which the dispersion is to be applied and the kind of organic medium used. Normally, to achieve good coverage, the dispersions will contain complementally by weight 40–90% solids and 60–10% organic medium.

The pastes are conveniently prepared on a three-roll mill. The viscosity of the pastes is typically 0.1–300 Pa.s when measured at room temperature on Brookfield viscometers at low, moderate and high shear rates. The amount and type of organic medium (vehicle) utilized is determined mainly by the final desired formulation viscosity and print thickness.

The compositions of the invention can also be easily used for the manufacture of green tape by the conventional method of slip casting a slurry of the glass particles and ceramic oxide fillers dispersed in a solution of binder polymer, plasticizer and volatile solvent onto a flexible carrier such as polypropylene or Mylar® polyester film or stainless steel, adjusting the thickness of the cast film by passing the cast slurry under a doctor blade and then heating the doctored slurry to remove the volatile solvent from the layer by evaporation. The solid layer of solids dispersed in a matrix of solvent-free polymeric binder is removed from the carrier and slit to appropriate widths for use in making multilayer structures. Green tapes of this kind generally have a thickness of 3 to 15 mils. As used herein, the term "solvent free" as applied to the solid green tape polymer means that the polymer contains no more than (0.1%) 1000 ppm by weight volatile solvent.

A wide variety of polymeric materials can be used as the binder for green tape such as poly (vinyl butyral), poly (vinyl acetate), poly (vinyl alcohol), cellulosic polymers such as methyl cellulose, ethyl cellulose, hydroxyethyl cellulose, methylhydroxyethyl cellulose, atactic polypropylene, polyethylene, silicon polymers such as poly (methyl siloxane), poly (methylphenyl siloxane), polystyrene, butadiene/styrene copolymer, polystyrene, poly (vinyl pyrrolidone), polyamides, high molecular weight polyethers, copolymers of ethylene oxide and propylene oxide, polyacrylamides, and various acrylic polymers such as sodium polyacrylate, poly (lower alkyl acrylates), poly (lower alkyl methacrylates) and various copolymers and multipolymers of lower alkyl acrylates and methacrylates. Copolymers of ethyl methacrylate and methyl acrylate and terpolymers of ethyl acrylate, methyl methacrylate and methacrylic acid are preferred.

A preferred class of polymeric binders for making green tapes for the composition of the invention are those disclosed by Usala in U.S. Pat. No. 4,613,648. These polymeric binders are a mixture of compatible multipolymers of 0–100% wt. $C_{1-8}$ alkyl methacrylate, 100–0% wt. $C_{1-8}$ alkyl acrylate, and 0–5% wt. ethylenically unsaturated carboxylic acid or amine, the multipolymer being further characterized as having a number average molecular weight ($M_n$) of 50,000 to 100,000, a weight average molecular weight ($M_w$) of 150,000 to 350,000, the ratio of $M_w$ to $M_n$ being no greater than 5.5, the total mount of unsaturated carboxylic acid or amine in the multipolymer mixture is 0.2–2.0% wt., and the glass transition temperature of the polymer and plasticizer therein, if any, is $-30°$ to $+45°$ C.

The organic medium in which the ceramic solids are dispersed contains principally the polymeric binder. However, the medium may contain other dissolved materials such as plasticizers, release agents, dispersing agents, thixotropic agents, stripping agents, antifouling agents and wetting agents.

It will be recognized that by adjusting the rheological properties of the dispersions of the invention and by changing the solvent component of the organic medium, the invention compositions can be applied to substrates by other methods than casting, e.g., by screen printing. When the compositions are applied by screen printing, the conventional organic media materials used for thick film materials can be used so long as the acrylic polymers are completely soluble therein at application temperatures.

For casting solutions, the solvent component of the organic medium is chosen so as to obtain complete solution therein of the polymer and sufficiently high volatility to enable the solvent to be evaporated from the dispersion by the application of relatively low levels of heat at atmospheric pressure. In addition, the solvent must boil well below the boiling point and decomposition temperature of any other additives contained in the organic medium. Thus, solvents having atmospheric boiling points below 150° C. are used most frequently. Such solvents include benzene, acetone, xylene, methanol, ethanol, methylethyl ketone, 1,1,1-trichloroethane, tetrachloroethylene, amyl acetate, 2,2,4-triethylpentanediol-1,3-mono isobutyrate, toluene, methylene chloride, 2-propanol and Freon ® TF (trichlorotrifluoroethane). Suitable casting solutions include those disclosed in the above-referred Usala patent.

Test Procedures

Capacitance—Capacitance is a measure of the capability of a material to store an electric charge. Expressed mathematically, $C = \epsilon_o KA$ divided by t, where $\epsilon_o$ is the permitivity of free space, A equals area overlap of the conductors, t is thickness of the dielectric layer and K is dielectric constant.

The units of capacitance are farads or fractions thereof such as microfarads, $10^{-9}$ farad, or picofarads $10^{-12}$ farad.

Dissipation Factor—Dissipation Factor (DF) is a measure of the phase difference between voltage and current. In a perfect capacitor, the phase difference would be 90°. However, in practical dielectric systems, DF is less than 90° because of leakage and relaxation losses. In particular, DF is the tangent of the angle by which the current lags the 90° vector.

Breakdown Voltage—The Breakdown Voltage test (also called the dielectric strength test) consists of the application of a voltage higher than rated voltage for a specific time between mutually insulated portions of a component part or between insulated portions and ground. The voltage is raised until the system fails which is indicated by short circuiting. This is used to observe whether the component part can operate safely at its rated voltage and withstand momentary overpotentials due to switching, surges, and other similar phenomena. Although this test is often called a voltage breakdown or dielectric strength test, it is not intended that this test cause insulation breakdown or that it be used for detecting corona. Rather it serves to determine whether insulating materials and spacings in the component part are adequate. When a component part is faulty in these respects, application of the test voltage will result in either disruptive discharge or deterioration. Disruptive discharge is evidenced by flashover (surface discharge), sparkover (air discharge), or breakdown (puncture discharge). Deterioration due to excessive leakage currents may change electrical parameters or physical characteristics. Dielectric breakdown is reported in volts/rail or volts/cm of dielectric thickness. Dielectric layers are designed to have sufficient thickness to provide a margin of safety well below the breakdown of the electric. The test is conducted in accordance with MIL-STD-202E. 16 Apr. 1973.

EXAMPLES

Dielectric compositions having two glasses, ceramic filler such as $Al_2O_3$, a colorant and various levels and particle size distribution (PSD) of $RuO_2$, CoO and $Co_3O_4$ were prepared. The electrical properties as a dielectric were tested using a pure silver thick film conductor. The conductor used is essentially similar to a commercial conductor Du Pont 6160. Additional tests were performed with a YAG laser to test trim performance conducted on bare dielectric.

TABLE 1

Dielectric Glass Compositions

| Component | Glass I (% Wt.) | Glass II (% Wt.) |
|---|---|---|
| $SiO_2$ | 41.1 | 42.0 |
| ZnO | 31.4 | 22.3 |
| CaO | 22.4 | 18.8 |
| BaO | 2.7 | 5.9 |
| SrO | — | 4.0 |
| $ZrO_2$ | 1.4 | 2.9 |
| $Al_2O_3$ | 0.2 | 4.0 |
| $P_2O_5$ | 0.7 | — |

TABLE 2

Composition and Properties of Thick Film Dielectric Paste Formulations

| Composition, % Wt. | Paste No. | | | | | |
|---|---|---|---|---|---|---|
| | A | B | C | D | E | F |
| Composition | | | | | | |
| Glass I | 39.6 | 39.6 | 39.1 | 39.6 | 39.5 | 39.4 |
| Glass II | 39.6 | 39.6 | 39.1 | 39.6 | 39.5 | 39.4 |
| $Al_2O_3$ (0.7 μm mean) | 19.8 | 19.8 | 19.6 | 19.8 | 19.8 | 19.7 |
| CoCr Aluminate | 1.0 | 1.0 | 1.0 | 1.0 | 1.0 | 1.0 |
| $RuO_2$ (10 m²/g SA) | — | 0.1 | — | — | — | — |
| CoO (7 μm) | — | — | 1.2 | — | — | — |
| $Co_3O_4$ (1.8 μm) | — | — | — | 0.1 | 0.2 | 0.5 |
| Properties | | | | | | |
| K | 9.2 | 8.9 | 9.9 | 9.8 | 9.9 | 9.3 |
| D.F. (%) | 0.07 | 0.46 | 0.10 | 0.09 | 0.11 | 0.16 |
| Breakdown Voltage (kV/mil) | 1.9 | 1.6 | 1.8 | 2.0 | 1.9 | 2.1 |

Laser Scribe Performance

The testing was done with a Chicago Laser Systems Inc. Model 712TQ laser trimer. Test samples were prepared by printing thick film dielectric layers 30 μm thick when fired on 2"×2" 96% alumina substrates. The laser trimming was performed for two parameter sets to simulate higher energy and lower energy with commonly used pulse rates. The bite size used was 0.1 mil at a frequency of 5.5 kHz. The laser trimmed dielectric samples were then examined using an optical microscope to observe the edges of the trimmed region (kerf) for each trim energy used. Poor performance is indicated by fractured edges. Excellent performance was judged by smooth and continuous kerf edges without any signs of fracture. All samples which were trimmed with the higher energy trim condition (3.15 watt) showed continuous and smooth trim edges. However, samples with cobalt oxide and/or $RuO_2$ additions exhibited smoother edges. The critical test was found to be the use of lower trim energies (1.08 watt) where the threshold for damage to the dielectric is more critical. For this reason, the low power trim condition became the critical test condition for all the laser trim tests. The results of the trim tests are shown in the following table:

TABLE 3

| Condition of Trim Kerf at Lower Power (1.08 W) | Laser Trim Properties Dielectric Paste No. | | | | | |
|---|---|---|---|---|---|---|
| | A | B | C | D | E | F |
| Serious Fracture | X | | | | | |
| Little Fracture | | | X | | | |
| Discontinuous | X | | | | | |
| Continuous | | X | X | X | X | X |
| Non-Smooth | X | | | | | |
| Smooth | | X | X | X | X | X |

These tests of laser trim performance indicate that improvements in the trim kerf occur with progressive addition of cobalt oxides and/or ruthenium dioxide. Ruthenium oxide has an undesirable effect on the DF% and is therefore less suitable than cobalt oxide for its effect on laser trimming characteristics. Samples D, E and F show slight progressive improvements in trim uniformity. However, even the lowest additive level of cobalt oxide (D) is effective at improving trim performance. As progressively increasing amounts of cobalt oxide are added, a near neutral gray color tone is enhanced. The highest level of cobalt oxide additive shows some increase in the DF % which is undesirable. However, the major concern for this additive level is that the dielectric color is judged to be too dark for automated optical inspection systems used by circuit manufacturers. The upper limit on the amount of cobalt oxide added is imposed by the resultant darker color of a formulated dielectric. Since there is also a dependence of scattering and therefore effective absorption on the particle size of the cobalt oxide, both particle size and the amount of additive must be adjusted to achieve an acceptable color for the dielectric.

We claim:

1. A composition for making fired layers which are especially suitable for laser scribing consisting essentially of finely divided particles of:
   (a) 68.0–94.99% wt. dielectric glass;
   (b) 5–30% wt. inorganic filler having a particle size between 0.3–3 microns and a refractive index at least 0.07 higher than the refractive index of the dielectric glass; and
   (c) 0.01–2.0% wt. cobalt oxide having a particle size less than 5 microns and is selected from CoO, $Co_3O_4$ and mixtures thereof, all of (a), (b), and (c) being dispersed in;
   (d) an organic medium.

2. The composition of claim 1 in the form of a thick film paste in which the organic medium is a liquid solution of polymer in nonvolatile solvent.

3. The composition of claim 1 in the form of a green tape in which the organic medium is a solid matrix of solvent-free organic polymer.

4. The composition of claim 1 in which the filler is selected from $Al_2O_3$, $ZrO_2$ and mixtures thereof.

5. The composition of claim 1 in which the glass has a refractive index between 1.4 and 1.7.

6. The composition of claim 2 in which the organic medium is comprised of ethyl cellulose dissolved in beta terpineol.

7. The composition of claim 2 in which the organic medium is composed of an acrylate or methacrylate polymer dissolved in Carbitol TM acetate (diethylene glycol mono ethyl ether acetate).

8. The composition of claim 1 in which the glass is an amorphous partially crystallizing glass.

9. The composition of claim 1 in which the glass is an amorphous non-crystallizing glass.

10. The composition of claim 1 in which the glass is an amophorous totally crystallizing glass.

* * * * *